United States Patent
Wagu et al.

(10) Patent No.: US 7,905,558 B2
(45) Date of Patent: Mar. 15, 2011

(54) VEHICULAR BRAKE HYDRAULIC CONTROL DEVICE

(75) Inventors: Takayuki Wagu, Nagano (JP); Tsuyoshi Maruyama, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 733 days.

(21) Appl. No.: 11/457,009

(22) Filed: Jul. 12, 2006

(65) Prior Publication Data

US 2007/0012528 A1 Jan. 18, 2007

(30) Foreign Application Priority Data

Jul. 13, 2005 (JP) ................................. 2005-204832

(51) Int. Cl.
*B60T 8/36* (2006.01)
(52) U.S. Cl. ..................................................... 303/119.3
(58) Field of Classification Search .... 303/119.1–119.3, 303/DIG. 10; 277/594, 596
See application file for complete search history.

(56) References Cited

U.S. PATENT DOCUMENTS

| | | | | | |
|---|---|---|---|---|---|
| 4,626,045 | A | * | 12/1986 | Takei et al. | 303/119.3 |
| 5,482,362 | A | * | 1/1996 | Robinson | 303/119.2 |
| 6,048,041 | A | * | 4/2000 | Mueller et al. | 303/119.2 |
| 6,059,382 | A | * | 5/2000 | Schoettl | 303/119.3 |
| 6,079,798 | A | * | 6/2000 | Hosoya | 303/119.3 |
| 6,148,855 | A | * | 11/2000 | Rauner et al. | 137/560 |
| 6,186,603 | B1 | * | 2/2001 | Park | 303/119.3 |
| 6,293,634 | B1 | * | 9/2001 | Hosoya | 303/119.2 |
| 6,786,466 | B1 | * | 9/2004 | Risch et al. | 251/129.15 |
| 7,150,292 | B2 | * | 12/2006 | Roether et al. | 137/596.16 |
| 7,213,814 | B2 | * | 5/2007 | Hurlbert et al. | 277/630 |
| 7,419,228 | B2 | * | 9/2008 | Jocham | 303/119.3 |
| 2004/0262559 | A1 | | 12/2004 | Shibata | |

FOREIGN PATENT DOCUMENTS

| | | |
|---|---|---|
| DE | 198 33 498 | 1/1999 |
| EP | 0 893 636 | 1/1999 |
| JP | 9511965 | 12/1997 |
| JP | 11511413 | 10/1999 |
| JP | 2000320683 | 11/2000 |
| JP | 2003154929 | 5/2003 |

OTHER PUBLICATIONS

English translation for Office Action regarding corresponding Japanese Application No. 2005-204832.
European Search Report for corresponding Application No. 06014590.1, dated Oct. 4, 2010.

* cited by examiner

*Primary Examiner* — Xuan Lan Nguyen
(74) *Attorney, Agent, or Firm* — Andrew M. Calderon; Roberts Mlotkowski Safran & Cole, P.C.

(57) ABSTRACT

The vehicular brake hydraulic control device includes a plurality of electromagnetic valves arranged at regular intervals on a first attaching plane of a body, and coil assemblies fit over each of the electromagnetic valves, wherein the coil assemblies adjacent to one another are arranged apart by a predetermined gap. The vehicular brake hydraulic control device further includes a rubber seal having a linear segment formed in a convex sectional shape swelling outwardly of the first attaching plane of the body, in which the hem of the seal is sandwiched between the coil assemblies and the first attaching plane of the body, and the apex of the seal enters between the coil assemblies adjacent to one each other.

22 Claims, 6 Drawing Sheets

VEHICULAR BRAKE HYDRAULIC CONTROL DEVICE

The present invention relates to a vehicular brake hydraulic control device in which a coil assembly fits over an electromagnetic valve is fixed to a housing through a connecting terminal.

BACKGROUND OF THE INVENTION

1. Technical Field

The present invention relates to a vehicular brake hydraulic control device in which a coil assembly fit over an electromagnetic valve is fixed to a housing through a connecting terminal.

2. Background Art

Generally, a vehicular brake hydraulic control device mainly includes a body in which a fluid path is formed, an electromagnetic valve for appropriately closing/opening the fluid path within the body, a coil assembly for moving a valve mechanism within the electromagnetic valve by magnetic force, and a housing provided with a control board for controlling the supply/stop of a current to the coil assembly.

As such a vehicular brake hydraulic control device, there is a previously known structure in which a part of the electromagnetic valve is mounted in a mounting slot of the body and another part thereof projects from the surface of the body. The connecting terminal of the coil assembly is projection-welded to the connecting terminal coupled with the control board of the housing so that the coil assembly is fixed in a state suspended from the housing through the connecting terminals (see JP-A-2003-154929). Such a vehicular brake hydraulic control device is assembled in such a manner that in attaching the housing to the body, a cylindrical coil assembly is fit over a projected electromagnetic valve.

Meanwhile, in the traditional structure, although the coil assembly is fixed to the housing through the connecting terminals, the other portion of the assembly is not fixed. In addition, there is a gap between a fitting slot of the coil assembly and the electromagnetic valve. Thus, if excessive vibration is applied to the vehicular brake hydraulic control device while a vehicle runs, the coil assembly is shaken so that a load repeatedly acts on the connecting terminals and their welded portions.

In view of this problem, an object of present invention is to provide a vehicular brake hydraulic control device capable of suppressing the vibration of a coil assembly to suppress the load applied to connecting terminals even when excessive vibration is applied to the vehicular brake hydraulic control device.

SUMMARY OF THE INVENTION

In order to solve the above problems according to a first aspect of the invention, there is provided a vehicular brake hydraulic control device comprising:

a body that includes a hydraulic circuit;

a plurality of electromagnetic valves arranged on one end face of the body so as to have a predetermined intervals therebetween;

a plurality of coil assemblies that fit over each of the electromagnetic valves, the coil assemblies adjacent to one another being separated by a predetermined gap and each of the coil assemblies comprising a connecting terminal;

a housing that is mounted on the one end face of the body and that covers the plurality of electromagnetic valves;

a control unit fixed within the housing that controls a current supply to the plurality of coil assemblies to control an operation of the plurality of electromagnetic valves, and that comprises a plurality of connecting terminals; and an elastic member that is provided on the one end face of the body and that has a convex sectional shape swelling outwardly of the one end face, a hem of the elastic member being sandwiched between the plurality of coil assemblies and the one end face of the body, and an apex of the elastic member wedging between the coil assemblies that are adjacent to one another;

wherein when the plurality of connecting terminals of the coil assemblies and the plurality of connecting terminals of the control unit are electrically connected so as to form a housing unit comprising the plurality of coil assemblies, the control unit, and the housing.

In accordance with the first aspect of the invention, when the housing unit is attached to the body, the hem of the elastic member is sandwiched between the coil assemblies and the body, and the apex of the elastic body enters between adjacent coil assemblies. At this time, since the hem of the elastic body is pressed by the coil assemblies, the apex of the elastic body swells. Thus, the apex appropriately enters the gap between the adjacent coil assemblies so that the resulting restoring force limits the relative movement of each the coil assemblies. Accordingly, since the bottom and side of each the coil assemblies is favorably supported by the elastic member, even if excessive vibration is applied to the vehicular brake hydraulic control device (for example while the vehicle runs), the vibration of the coil assemblies is suppressed by the elastic member so that the load applied to the connecting terminal can be suppressed.

According to a second aspect of the invention, the elastic member may further comprises a linear segment that extends along the arrangement of the plurality of electromagnetic valves, and an engagement segment that engages with the housing.

Now, "engagement segment engaged with the housing" refers to a region attached to the housing by fitting, bonding, or sandwiching, so as not to permit the relative movement.

In accordance with the second aspect of the invention, since the elastic member has a linear segment along the arrangement of the plurality of electromagnetic valves, each coil assembly that fits over each of the electromagnetic valves can be collectively supported by a small quantity of the elastic member. Thus, cost reduction and reduction of the number of components can be realized.

Further, since the elastic member has the engagement segment engaged with the housing, this engagement segment is engaged with the housing during assembly and so movement (displacement) of the elastic member within the housing is suppressed. This facilitates the assembling operation, According to a third aspect of the invention, the engagement segment of the elastic member may be a sealing member that fits in a peripheral edge of an opening of the housing and that seals the gap between the housing and the body.

In accordance with the third aspect of the invention, since the sealing member for sealing the gap between the housing and the body is formed integrally to the elastic member as an engagement segment of the elastic member, the number of components can be reduced, thereby facilitating component management and reducing the production cost. Further, the engagement segment serving as the sealing member only has to be fit around the peripheral edge of an opening of the housing to provisionally fix the elastic member to an exact position, thereby simplifying the assembling operation.

According to a fourth aspect of the invention, the elastic member may be an elastic hardening agent that hardens to form an elastic body, and the elastic hardening agent is applied so as to swell from the one end face of the body before the housing unit is mounted on the body.

In accordance with the fourth aspect of the invention, the elastic hardening agent applied to the one end face of the body does not move relatively to the body when the housing unit is attached, thereby facilitating assembling operation. Further, for example, wherein the housing unit is attached before the elastic hardening agent is completely hardened, since each of the coil assemblies is forcibly pushed into the elastic hardening agent that is in a soft condition, the load applied to each of the coil assemblies when the housing unit is attached is reduced. Thus, it is possible to prevent excessive force from being applied to the connecting terminal of each the coil assemblies.

According to a fifth aspect of the invention, there is provided a vehicular brake hydraulic control device comprising:
a body that includes a hydraulic circuit;
a plurality of electromagnetic valves arranged on one end face of the body so as to have a predetermined intervals therebetween;
a plurality of coil assemblies that fit over each of the electromagnetic valves, the coil assemblies adjacent to one another being separated by a predetermined gap and each of the coil assemblies comprising a connecting terminal;
a housing that is mounted on the one end face of the body and that covers the plurality of electromagnetic valves; and
a control unit fixed within the housing that controls a current supply to the plurality of coil assemblies to control an operation of the plurality of electromagnetic valves and that comprises a plurality of connecting terminals;
wherein the plurality of connecting terminals of the coil assemblies and the plurality of connecting terminals of the control unit are electrically connected so as to form a housing unit comprising the plurality of coil assemblies, the control unit and the housing, and
the plurality of coil assemblies are coupled with the body or the plurality of electromagnetic valves by an elastic hardening agent that is hardened to form an elastic body.

In accordance with the fifth aspect of the invention, since the coil assemblies are coupled with the body or the electromagnetic valves by the elastic hardening agent which is hardened to be an elastic body, the bottom of each of the coil assemblies is favorably supported by the elastic hardening agent. Thus, even if excessive vibration is applied to the vehicular brake hydraulic control device, for example while the vehicle runs, the vibration of the coil assembly is suppressed by the elastic member so that the load applied to the connecting terminal can be suppressed.

According to a sixth aspect of the invention, the elastic hardening agent may be applied dottedly or linearly. The phrase "applied dottedly" includes being applied to a surface by a plurality of dots.

In accordance with the sixth aspect of the invention, since the elastic hardening agent is applied dottedly or linearly at the necessary and minimum number of areas, the cost reduction and the shortening of the assembling operation can be realized.

According to the first aspect of the invention, since the bottom and side of each of the coil assemblies is favorably supported by the elastic member, even if excessive vibration is applied to the vehicular brake hydraulic control device, the vibration of the coil assemblies is suppressed so that the load applied to the connecting terminals can be suppressed.

According to the second aspect of the invention, since the plurality of coil assemblies can be collectively supported by the linear segment of the elastic member, cost reduction and reduction in the number of components can be realized. Further, since the engagement segment of the elastic member is engaged with the housing during assembly, movement of the elastic member within the housing is suppressed. This facilitates the assembling operation.

According to the third aspect of the invention, since the sealing member for sealing the gap between the housing and the body is formed integrally with the elastic member for supporting each of the coil assemblies, cost reduction and reduction in the number of components can be realized. The assembling operation is also facilitated.

According to the fourth aspect of the invention, since the elastic hardening agent applied to the one end face of the body does not move relatively to the body when the housing unit is attached, the attaching operation is facilitated.

According to the fifth aspect of the invention, since the bottom or each of the coil assemblies, for example, is favorably supported by the elastic hardening agent, even if excessive vibration is applied to the vehicular brake hydraulic control device, the vibration of the coil assemblies is suppressed so that the load applied to the connecting terminals can be suppressed.

According to the sixth aspect of the invention, since the elastic hardening agent is applied dottedly or linearly at the necessary and minimum number of areas, the cost reduction and the shortening of the assembling operation can be realized.

DETAILED DESCRIPTION OF THE PREFERRED EMBODIMENTS

Figure 1:
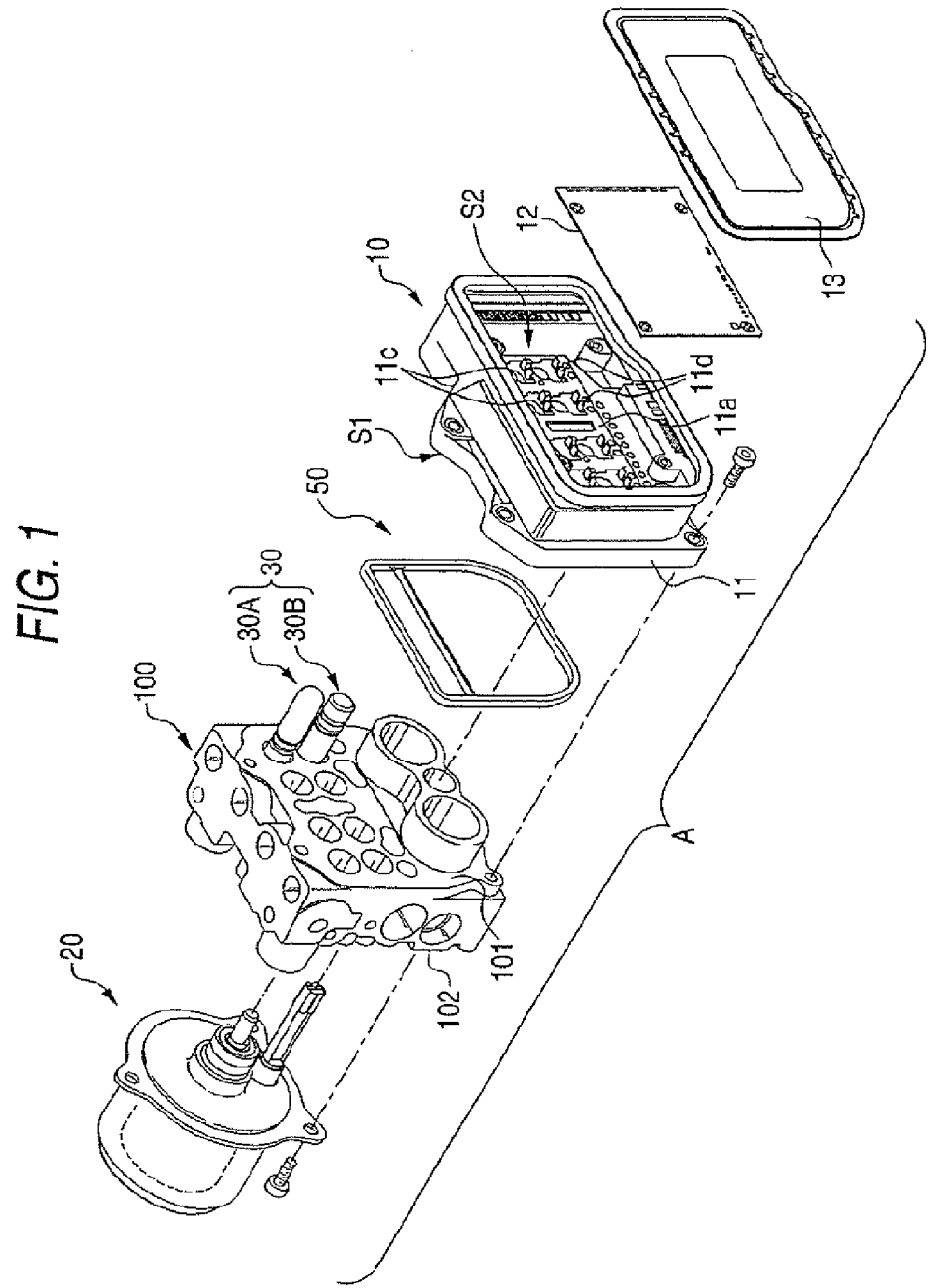
FIG. 1 is an exploded perspective view showing a vehicular brake hydraulic control device according to an embodiment.

By appropriately referring to the drawings, a detailed explanation will be given of various embodiments of present invention. In the drawings referred to, FIG. 1 is an exploded perspective view showing a vehicular brake hydraulic control device according to an embodiment.

As shown in FIG. 1, a vehicular brake hydraulic control device A mainly includes a body 100 incorporating a hydraulic circuit, a housing unit 10 mounted on the first attaching plane (one end face) 101 of the body 100, and an electric motor 20 mounted on the second attaching plane 102 of the body 100 for driving a pump (not shown) within the body 100.

The body 100 is a metallic component formed in a shape of a substantially rectangular parallelepiped. On the first attaching plane 101, eight electromagnetic valves 30 (specifically, normally-open electromagnetic valves 30A and normally-closed electromagnetic valves 30B only one of which is illustrated, respectively) are arranged in two rows and four columns and at regular intervals. The structure around these electromagnetic valves 30 will be explained later in detail.

The housing unit 10 mainly includes a housing body 11 having a first accommodating section S1 opened toward the body 100 and a second accommodating section S2 opened toward the side opposite to the body 100; an electronic control unit 12 accommodated in the second accommodating section S2 of the housing unit 11; a cover 13 for covering the second accommodating section S2 of the housing body 11; and coil assemblies 40 described later (see FIG. 2). Now, the housing body 11 and cover 13 corresponds to the "housing" referred to in claims.

The housing body 11 is cylindrically shaped, and the center portion has a partition wall 11a for partitioning the internal space into the first accommodating section S1 and the second accommodating section S2. A rubber seal (elastic material) 50 is fit over the peripheral edge (specifically, a rubber seal attaching groove 11b shown in FIG. 2) of the first accommodating section S1 of the housing body 11. Thus, when the electromagnetic valves 30 are covered with the housing body 11, the gap between the housing body 11 and the body 100 is sealed with the rubber seal 50. The structure of the rubber seal 50 will be explained later in detail. Further, as required, the partition wall 11a of the housing body 11 is provided with pass-through slots 11c and connecting terminals 11d which are used to insert the coil assemblies 40 shown in FIG. 2 from the side of the first accommodating section S1 and to fix the assemblies. It should be noted that the connecting terminals 11d are formed as a part of a metallic, plate embedded in the housing body 11 made of resin. The structure of the coil assembly 40 will be explained later in detail.

The electronic control unit 12 is a control board for controlling the operation of each the electromagnetic valves 30 and the electric motor 20 by appropriately controlling current supply (energization) to the coil assemblies 40 and electric motor 20. The electronic control unit 12 is fixed to the second accommodating section S2 of the housing body 11. Further, the electronic control unit 12 is electrically connected to the coil assemblies 40 and the electric motor 20 through the metallic plate embedded in the housing body 11.

Now referring to FIGS. 2 and 3, a detailed explanation will be given of the structure around the electromagnetic valves 30.

Figure 2:
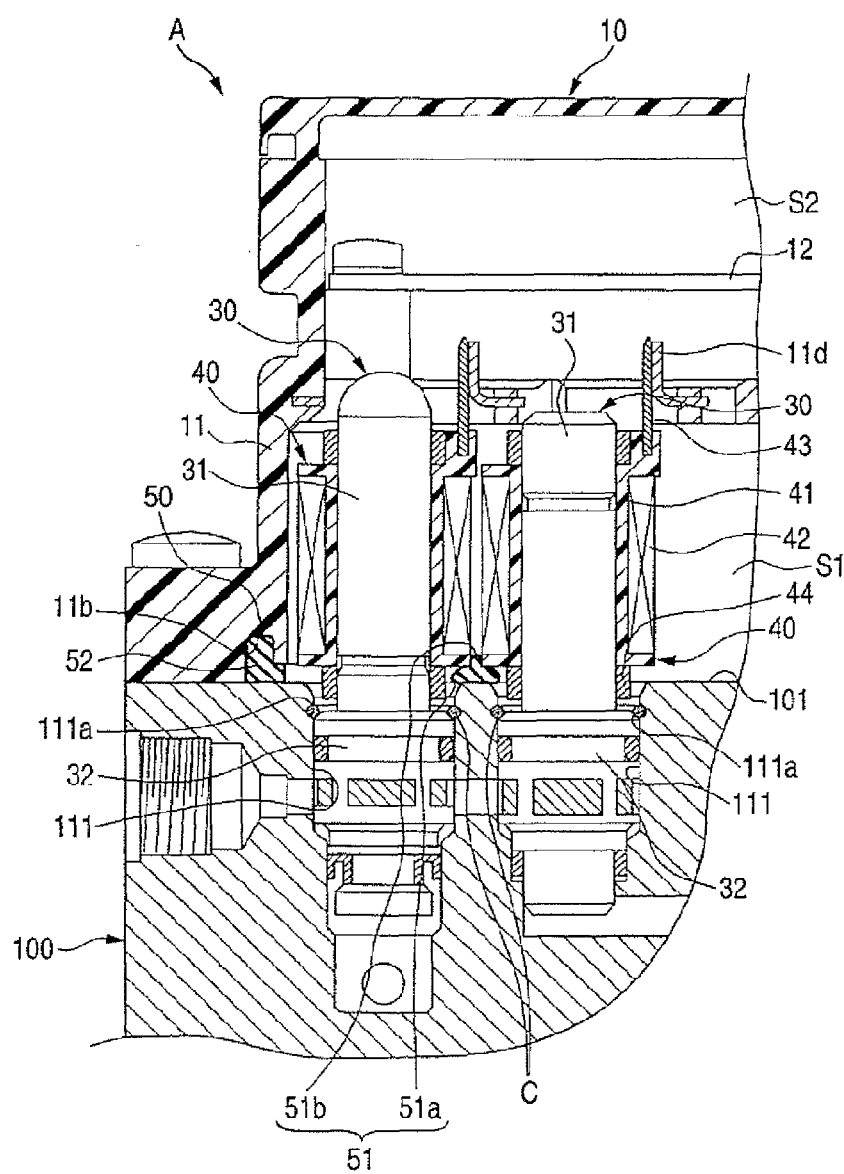
FIG. 2 is an enlarged sectional view of the main part of the structure around the electromagnetic valves.

In the drawings referred to, FIG. 2 is an enlarged sectional view of the main part of the structure around the electromagnetic valves.

Figure 3A:
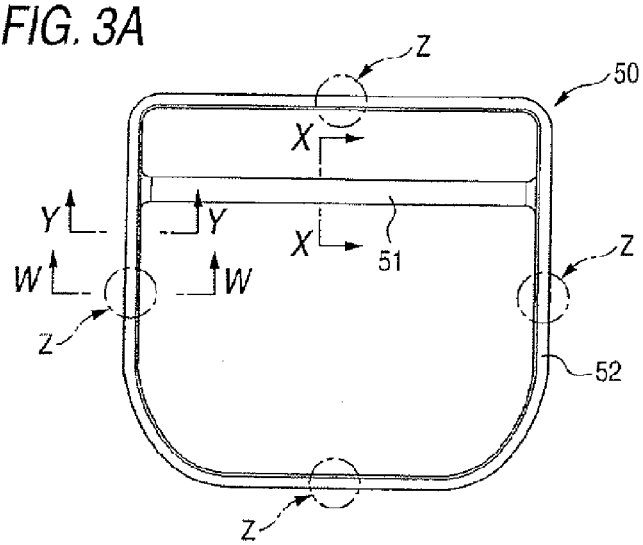
FIG. 3A is a plan view illustrating the details of a rubber seal.

FIG. 3 includes a plan view (FIG. 3A) illustrating the details of the rubber seal, a sectional view (FIG. 3B) taken in line X-X in FIG. 3A, a sectional view (FIG. 3C) taken in line Y-Y in FIG. 3A, an enlarged plan view (FIG. 3D) of an area indicated by arrow Z and a sectional view (FIG. 3E) taken in line W-W in FIG. 3A.

As shown in FIG. 2, each the electromagnetic valves 30 is formed in a shape of a stepped-cylindrical column by a guide cylinder 31 over which the coil assembly 40 is fit, and a valve housing 32 with a larger diameter than the guide cylinder 31. The guide cylinder 31 includes a movable core (not shown) which is moved by magnetic force generated by the coil assembly 40. The valve housing 32 includes a valve mechanism which serves to open/close the valve according to the movement of the movable core. The electromagnetic valve 30 is fixed to the body 100 in a state where the valve housing 32 with the larger diameter is embedded in an electromagnetic-valve mounting slot 111 formed in the first attaching plane 101 of the body 100 and the guide cylinder 31 is projected from the first attaching plane 101. More specifically, the electromagnetic valve 30 is fixed to the body 100 in a removal-stopped state where the corner on the upper side (side of the guide cylinder 31) of the valve housing 32 is engaged with a clip C firmly fit in a clip attaching groove 111a in the vicinity of the opening end of the electromagnetic valve mounting slot 111.

The coil assembly 40 mainly includes a bobbin 41 fitting over the guide cylinder 31 of the electromagnetic valve 30, a coil 42 wound around the bobbin 41, a connecting terminal 43 electrically connected to the coil 42 and projecting outwardly in an axial direction from the end of the bobbin, and a C-shape (the opening is oriented into the page or out of the page) magnetic path frame 44 mounted in the bobbin 41 so as to sandwich both ends of the bobbin 41. Each coil assembly 40 is fixed in a state suspended through the connecting terminal 43 from the housing unit 10, before the housing unit 10 is mounted in the body 100, in such a manner that the connecting terminal 43 is projection-welded on the connecting terminal 11d of the housing unit 10. It should be noted that after the housing unit 10 has been mounted in the body 100, i.e. in a state where each coil assembly 40 fits over each electromagnetic valve 30, the coil assemblies 40 adjacent to one another are arranged with a prescribed gap therebetween.

As illustrated in FIG. 3A, the rubber seal 50 is composed of a linear segment 51 along the row direction (arrangement) of the electromagnetic valves 30 (see FIG. 1) arranged in two rows and four columns and a ring-shaped seal segment (engagement segment) 52 fitting in the rubber seal attaching groove 11b (see FIG. 2) formed in the opening of the housing body 11.

Figure 3B:
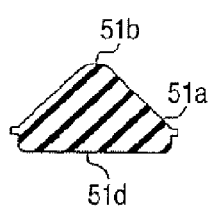
FIG. 3B is a sectional view taken in line X-X in FIG. 3A.

The liner segment 51, as illustrated in FIG. 3B, is formed in a substantially triangular convex sectional shape comprising a convex apex 51b, a hem 51a and a bottom 51d. The bottom 51d is connected to the first attaching plane 101 of the body 100 shown in FIG. 2 and the apex 51b swells outwardly of the first attaching plane 101. In the state where the housing unit 10 has been mounted in the body 100, the linear segment 51 enters the gaps between adjacent coil assemblies and sandwiched therebetween in such a manner that the hem 51a is sandwiched and crushed between the adjacent coil assemblies 40 and the first attaching plane 101 of the body 100, and the apex 51b swells owing to the crush deformation of the hem 51a.

Figure 3C:
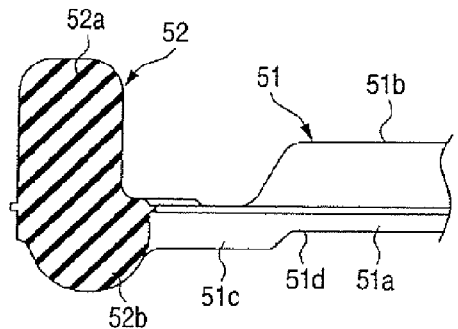
FIG. 3C is a sectional view taken in line Y-Y in FIG. 3A.

Further, the linear segment 51, as illustrated in FIG. 3C, is formed so that both ends (only one end is shown) serve as relief areas 51c offset in the direction from the apex 51b toward the hem 51a. Thus, as illustrated in FIG. 2, interference between the rubber seal 50 and the housing body 11 (specifically, the wall constituting the rubber seal attaching groove 11b) is prevented so that the seal segment 52 can be surely fit deeply into the rubber seal attaching groove 11b.

Figure 3D:
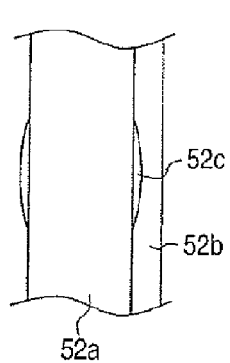
FIG. 3D is an enlarged plan view of an area indicated by arrow Z.
Figure 3E:
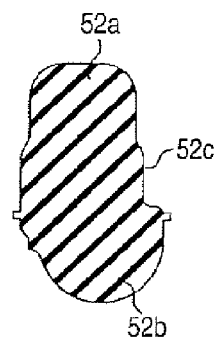
FIG. 3E is and a sectional view taken in line W-W in FIG. 3A.

The seal segment 52, as illustrated in FIG. 3C, includes a base area 52a having a size nearly equal to that of the rubber seal attaching groove 11b, and a sectionally semi-circular airtight area 52b which projects in the direction opposite to the base area 52a and slightly swells out internally (toward the linear segment 51). Further, as illustrated in FIGS. 3D and 3E, swell-out areas 52 each being wider than the base area 52a are formed at appropriate positions (specifically, centers of the respective sides) of the seal segment 52 formed in a nearly square ring shape as shown in FIG. 3A. Thus, since the swell-out areas 52c are accommodated in the rubber seal attaching groove 11b in a state slightly contracted by a prescribed quantity, the rubber seal 50 car, be dealt with in the sub-assembled state (provisionally fixed) in the rubber seal attaching groove 11b. The ring-shaped seal segment 52 thus configured serves as the sealing member for sealing the gap between the housing body 11 and the body 100.

Next, an explanation will be given of the operation of the linear segment 51 of the rubber seal 50 according to this embodiment.

As shown in FIG. 2, when the housing unit 10 is attached to the body 100, the hem 51a of the linear segment 51 is sandwiched between the coil assemblies 40 and the body 100, and the apex 51b of the linear segment 51 is also sandwiched between adjacent coil assemblies 40. At this time, since the hem 51a of the linear segment 51 is pressed by the coil assemblies 40, the apex 51b of the linear segment 51 swells. Thus, the apex 51b favorably enters the gap between the adjacent coil assemblies so that the resulting restoring force limits the relative movement of each the coil assemblies 40.

As understood from the above description, in accordance with this embodiment, the following advantages can be obtained.

Since the bottom and side of the coil assembly 40 is favorably supported by the linear segment 51, even if excessive vibration is applied to the vehicular brake hydraulic control device A, the vibration of the coil assemblies 40 is suppressed so that the load applied to the connecting terminals 43 can be suppressed.

Since the plurality of coil assemblies 40 can be collectively supported by the linear segment 51, cost reduction and reduction in the number of components can be realized. Further, when the seal segment 52 of the rubber seal 50 is fit in the housing body 11 in assembling, the relative position of the linear segment 51 to the housing body 11 can be exactly determined, thus facilitating the assembling operation.

Without being limited to the above embodiment, the present invention can be realized in various manners.

In the above embodiment, the linear segment 51 and the seal segment 52 serving as the sealing member were formed integrally. However, without being limited to this, the linear segment 51 and the seal segment 52 may be formed separately, and further may be coupled with each other through e.g. convex/concave areas. Further, at both ends of the linear segment 51 thus separated, slots serving as engagement areas may be made and projections to be fit in these slots may be formed in the housing body 11. In this manner also, when the housing unit 10 is attached to the body 100, by previously fixing the linear segment 51 to the projections of the housing body 11 by fitting, misalignment of the linear segment 51 can be prevented, thereby facilitating the assembling operation. However, in the above embodiment, since the seal segment 52 serving as the sealing member and the linear segment 51 are constructed integrally, in addition of the effect of facilitating the assembling operation, the effects of reducing the number of components to facilitate component management and reducing the production cost can be also obtained.

In the above embodiment, the present invention was applied to the structure in which eight electromagnetic valves 30 are arranged in two rows and four columns. However, the present invention is not limited to such a structure, and the number of the electromagnetic valves 30 and their arrangement can be set to an arbitrary number and configuration. Further, the number and direction of the linear segment 51 formed in the rubber seat 50 can be appropriately changed. For example, other linear segments extending in the same direction may be provided on both sides of the linear segment 51 so that the bottom of each coil assembly is supported at two points. Linear segments extending in the column direction of the electromagnetic valves arranged in two rows and four columns may be formed so that each coil assembly is supported. Further, the linear segments extending in the row direction and column direction may be formed integrally so as to intersect each other so that the coil assemblies 40 are supported by the linear segments formed in a matrix shape.

In the above embodiment, the sectional shape of the linear segment 51 was substantially triangular. However, the present invention is not limited to such a shape. As long as it is a convex shape capable of satisfactorily entering the gap among the coil assemblies 40 when the housing unit 10 is attached to the body 100, any shape can be adopted. Examples of the sectional shape are a T-shape, semi-circle polygon, etc.

Figure 4:
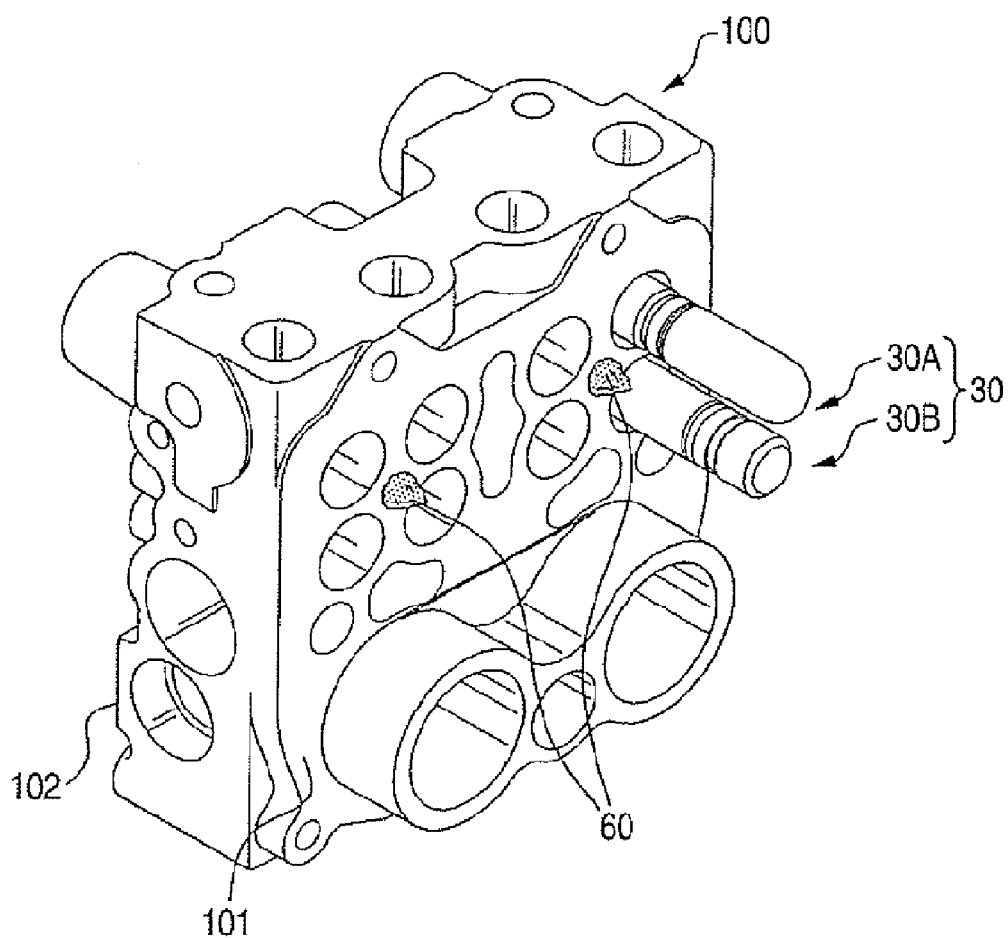
FIG. 4 is an enlarged perspective view showing the configuration in which a caulking agent is adopted as an elastic member.

In the above embodiment, as the elastic member, the rubber seal 50 was adopted. However, the present invention is not limited to such a material. For example, as shown in FIG. 4, a caulking agent (elastic hardening agent) 60 having elasticity and capable of being hardened may be adopted. Before the housing unit 10 is mounted on the body 100, caulking agents 60 may be applied to the areas each encircled by four electromagnetic valves 30 arranged in two rows and two columns (the area capable of collectively supporting the four electromagnetic valves 30) in the first attaching plane 101 of the body 100. In this way, the four coil assemblies 40 can be effectively supported by each caulking agent forming a dot or spot, thereby realizing cost reduction and shortening of the assembling operation. In this case, it is desirable that the caulking agent 60 is applied so that a portion thereof swells toward the gap among the coil assemblies 40 (see FIG. 2).

In accordance with this manner, after assembled, like the linear segment 51 in FIG. 2, the caulking agent 60 is deformed to satisfactorily support the bottom and side of each coil assembly 40. This limits vibration of each the coil assemblies 40, thereby suppressing the load to be applied to the connecting terminals 43. Further, the caulking agents 60 applied to the first attaching plane 101 of the body 100 do not move relatively to the body 100 when the housing unit 10 is mounted. This facilitates the mounting operation. Further, the operation of applying the caulking agent 60 can be easily automated by a machine. For this reason, different models (bodies) can be easily dealt with by only changing the positions where the caulking agent is applied.

The elastic hardening agent may be an elastic adhesive such as an oily caulking agent, urethane-type caulking, or silicon-type caulking agent. The method for applying the caulking agent (elastic hardening agent) is not limited to the method of dottedly applying the caulking agent, but may be the method of linearly applying it in the row direction among a group of four electromagnetic valves 30 arranged in two rows and four columns, or the method of linearly applying it in the column direction between each of pairs of electromagnetic valves 30 arranged in four columns. In accordance with this manner, by only linearly applying the caulking agent, the caulking agents can be set at the necessary and minimum number of areas. Thus, the cost reduction and the shortening of the assembling operation can be realized. Further, the caulking agent may be applied linearly (in the matrix shape) so as to intersect both row direction and column direction of the electromagnetic valves 30. In accordance with this manner, a greater part of the bottom of each coil assembly 40 can be supported so that vibration of the coil assemblies can be suppressed more effectively.

Figure 5:
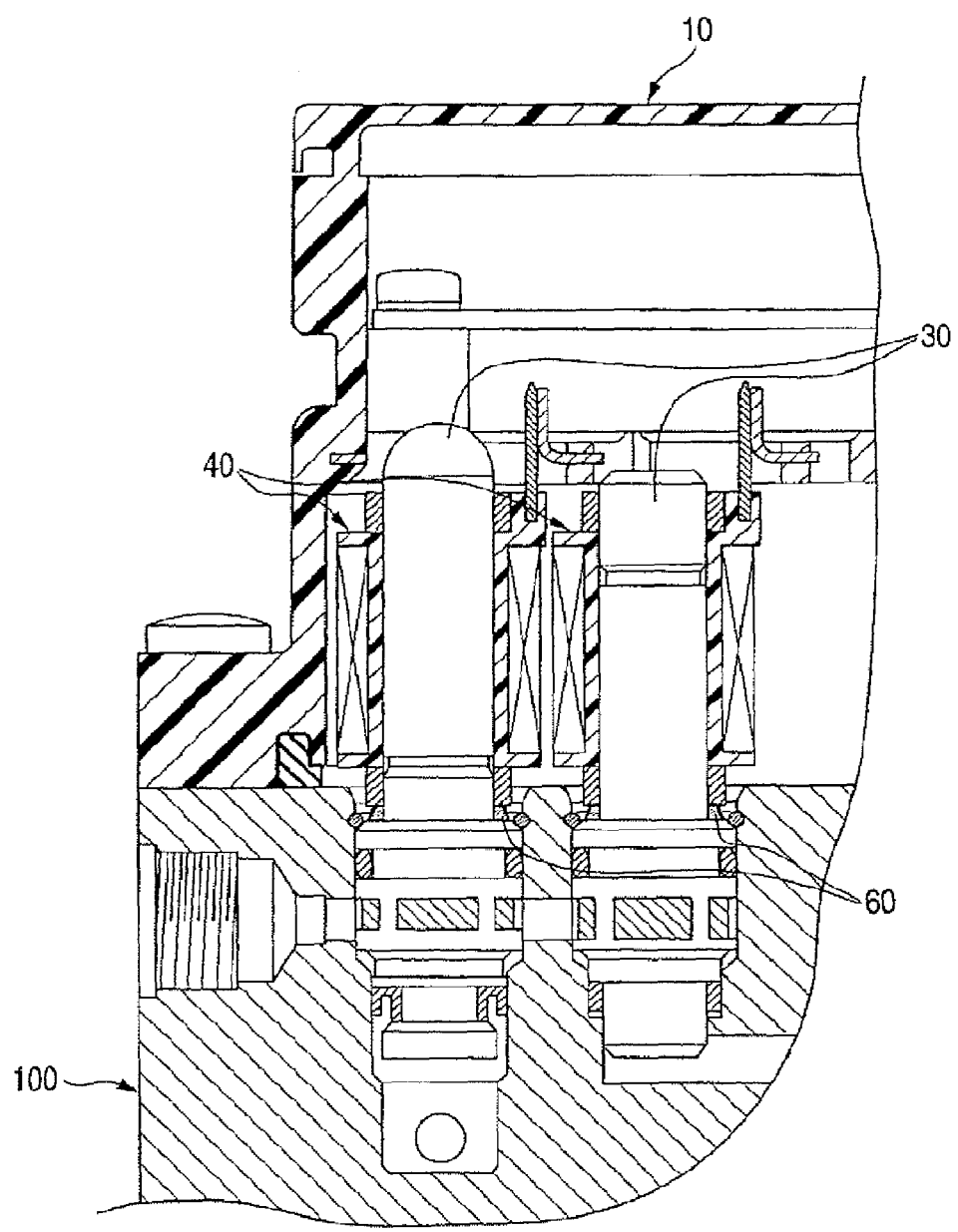
FIG. 5 is an enlarged view of the main part of the configuration in which the caulking agent is applied between an electromagnetic valve and a coil assembly.
Figure 6:
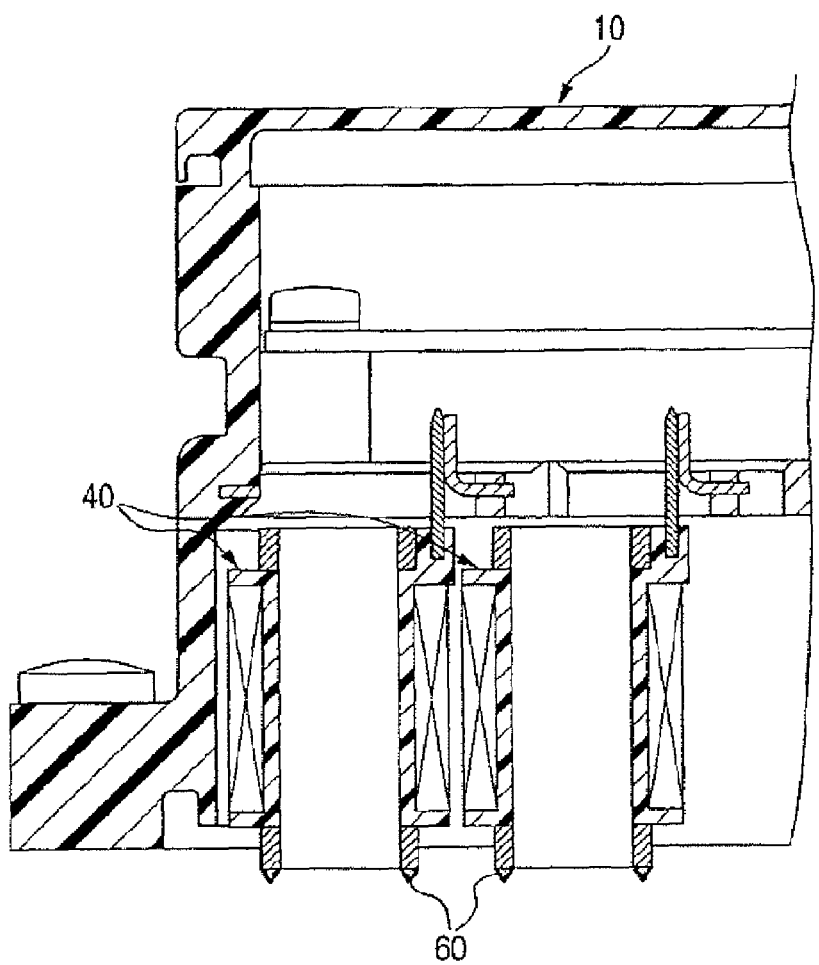
FIG. 6 is enlarged view of the main part of the configuration in which the caulking agent is previously applied on the side of the coil assembly.

The timing of hardening the caulking agent may be either before or after the housing unit 10 is mounted on the body 100. However, where the caulking agent is hardened after the housing unit 10 has been mounted, when the housing unit 10 is caused to approach the body 100, the caulking agent is soft and not as resistant. Therefore, it is possible to prevent excessive force from being applied to the connecting terminal 43 of the coil assembly 40. Further, since each coil assembly 40 is coupled with the body 100 by hardening of the caulking agent, owing to this coupling operation (operation of intimately coupling the caulking agent, each coil assembly 40 and body 100 with one another), vibration of each coil assembly 40 can be suppressed more effectively. Further, as shown in FIG. 5, when the caulking agent 60 is applied between each electromagnetic valve 30 and each coil assembly 40 and they are coupled with each other, the same effect as described above can be obtained. Further, the method of applying the caulking agent 60 should not be limited to the method of applying it to the body 100 or the electromagnetic valve 30 before assembly, but as shown in FIG. 6, nay be the method of applying the caulking agent linearly or dottedly on the face on the side of the body 100 of the coil assemblies 40 before assembly.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicular brake hydraulic control device comprising:
   a body that includes a hydraulic circuit;
   a plurality of electromagnetic valves arranged on one end face of the body so as to have a predetermined intervals therebetween;
   a plurality of coil assemblies that fit over each of the electromagnetic valves, the coil assemblies adjacent to one another being separated by a predetermined gap and each of the coil assemblies comprising a connecting terminal;
   a housing that is mounted on the one end face of the body and that covers the plurality of electromagnetic valves;
   a control unit fixed within the housing that controls a current supply to the plurality of coil assemblies to control an operation of the plurality of electromagnetic valves, and that comprises a plurality of connecting terminals; and
   an elastic member that is provided on the one end face of the body and that has a convex sectional shape portion which swells outwardly of the one end face, a hem of the convex sectional shape portion of the elastic member being sandwiched between the plurality of coil assemblies and the one end face of the body, and an apex of the convex sectional shape portion of the elastic member wedging between the coil assemblies that are adjacent to one another;
   wherein when the plurality of connecting terminals of the coil assemblies and the plurality of connecting terminals of the control unit are electrically connected so as to form a housing unit comprising the plurality of coil assemblies, the control unit, and the housing.

2. The vehicular brake hydraulic control device according to claim 1, wherein the elastic member further comprises:
   a linear segment that extends along the arrangement of the plurality of electromagnetic valves, and
   an engagement segment that engages with the housing.

3. The vehicular brake hydraulic control device according to claim 2, wherein the engagement segment of the elastic member is a sealing member that fits in a peripheral edge of an opening of the housing and that seals the gap between the housing and the body.

4. The vehicular brake hydraulic control device according to claim 1, wherein the elastic member is an elastic hardening agent that hardens to form an elastic body, and
   the elastic hardening agent is applied so as to swell from the one end face of the body before the housing unit is mounted on the body.

5. The vehicular brake hydraulic control device according to claim 1, wherein the elastic member is an elastic hardening agent encircled by four of the plurality of electromagnetic valves, and supports a bottom and side of four of the plurality of coil assemblies.

6. The vehicular brake hydraulic control device according to claim 5, wherein the elastic hardening agent is caulking agents.

7. The vehicular brake hydraulic control device according to claim 1, wherein the elastic member further comprises a linear segment comprising the convex sectional shape swelling outwardly of the one end face which forms the apex, and the hem sandwiched between the plurality of coil assemblies.

8. The vehicular brake hydraulic control device according to claim 7, wherein the convex sectional shape is substantially a triangular convex shape.

9. The vehicular brake hydraulic control device according to claim 7, wherein the linear segment is provided within gaps between adjacent coil assemblies of the plurality of coil assemblies and further sandwiched therebetween such that the hem is sandwiched and crushed between the adjacent coil assemblies and the one end face, and the apex swells due to the crush of the hem.

10. The vehicular brake hydraulic control device according to claim 7, wherein the linear segment includes relief areas on opposing ends, each of which are offset in a direction from the apex toward the hem.

11. The vehicular brake hydraulic control device according to claim 7, wherein:
    the elastic member is a ring shape seal member; and
    the linear segment extends between opposing portions of the ring shape seal member.

12. The vehicular brake hydraulic control device according to claim 11, wherein the ring shape seal member includes a seal segment having a base with a size nearly equal to that of a rubber seal attaching groove of the housing, and a sectionally semi-circular airtight area which projects in a direction opposite to the base and slightly swells out internally toward the linear segment.

13. The vehicular brake hydraulic control device according to claim 12, wherein the seal segment is near relief areas which are on opposing ends of the linear segment.

14. The vehicular brake hydraulic control device according to claim 12, wherein the seal segment includes swell-out areas which are wider than the base and formed at centers of respective sides of the seal segment.

15. The vehicular brake hydraulic control device according to claim 14, wherein the swell-out areas are accommodated in the rubber seal attaching groove.

16. The vehicular brake hydraulic control device according to claim 14, wherein the seal segment is fitted between the housing and the body.

17. A vehicular brake hydraulic control device comprising:
    a body that includes a hydraulic circuit;
    a plurality of electromagnetic valves arranged on one end face of the body so as to have predetermined intervals therebetween;

a plurality of coil assemblies that fit over each of the electromagnetic valves, the coil assemblies adjacent to one another being separated by a predetermined gap and each of the coil assemblies comprising a connecting terminal;

a housing that is mounted on the one end face of the body and that covers the plurality of electromagnetic valves; and a control unit fixed within the housing that controls a current supply to the plurality of coil assemblies to control an operation of the plurality of electromagnetic valves and that comprises a plurality of connecting terminals;

wherein the plurality of connecting terminals of the coil assemblies and the plurality of connecting terminals of the control unit are electrically connected so as to form a housing unit comprising the plurality of coil assemblies, the control unit and the housing, and the plurality of coil assemblies are coupled with the body or the plurality of electromagnetic valves by an elastic hardening agent applied on the body that swells outwardly towards the predetermined gap among the plurality of coil assemblies and that is hardened to form an elastic body, wherein the elastic hardening agent is disposed in an area collectively supporting the plurality of electromagnetic valves, wherein the elastic hardening agent forms a dot that supports each of the plurality of coil assemblies.

18. The vehicular brake hydraulic control device according to claim 17, wherein the elastic hardening agent is encircled by four of the plurality of electromagnetic valves and supports a bottom and side of four of the plurality of coil assemblies.

19. The vehicular brake hydraulic control device according to claim 17, wherein the elastic hardening agent is caulking agents.

20. The vehicular brake hydraulic control device according to claim 17, wherein the dot is disposed in an area collectively supporting the plurality of electromagnetic valves.

21. The vehicular brake hydraulic control device according to claim 20, wherein the dot is disposed on the body and between the plurality of electromagnetic valves.

22. The vehicular brake hydraulic control device according to claim 21, wherein the dot is disposed between four electromagnetic valves.

\* \* \* \* \*